US008793418B2

(12) United States Patent
Evans (10) Patent No.: US 8,793,418 B2
(45) Date of Patent: Jul. 29, 2014

(54) MULTI-DROP SERIAL BUS WITH LOCATION DETECTION AND METHOD

(75) Inventor: Duane Martin Evans, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 684 days.

(21) Appl. No.: 12/935,590

(22) PCT Filed: May 21, 2008

(86) PCT No.: PCT/US2008/064310
§ 371 (c)(1),
(2), (4) Date: Sep. 30, 2010

(87) PCT Pub. No.: WO2009/142632
PCT Pub. Date: Nov. 26, 2009

(65) Prior Publication Data
US 2011/0029705 A1 Feb. 3, 2011

(51) Int. Cl.
*G06F 13/00* (2006.01)
*G06F 13/42* (2006.01)

(52) U.S. Cl.
CPC ................... *G06F 13/4291* (2013.01)
USPC ........................................................ 710/110

(58) Field of Classification Search
None
See application file for complete search history.

(56) References Cited

U.S. PATENT DOCUMENTS

| 3,943,525 | A | * | 3/1976 | Skala | 347/55 |
| 4,438,434 | A | * | 3/1984 | Wason | 710/107 |
| 5,226,123 | A | * | 7/1993 | Vockenhuber | 710/316 |
| 5,336,947 | A | | 8/1994 | Lehning | |
| 5,418,554 | A | * | 5/1995 | Kiguchi et al. | 347/215 |
| 5,450,072 | A | * | 9/1995 | Vockenhuber | 340/9.1 |
| 5,670,845 | A | | 9/1997 | Grant et al. | |
| 5,721,573 | A | | 2/1998 | Benjamin | |
| 5,917,773 | A | * | 6/1999 | Yeo | 365/230.06 |
| 6,138,182 | A | | 10/2000 | Hennessy et al. | |
| 6,297,663 | B1 | | 10/2001 | Matsuoka et al. | |
| 6,838,999 | B1 | * | 1/2005 | Ropke | 340/9.16 |
| 6,910,089 | B2 | | 6/2005 | deBlanc et al. | |
| 7,009,118 | B2 | | 3/2006 | Pottebaum et al. | |
| 7,091,876 | B2 | * | 8/2006 | Steger | 340/9.1 |
| 7,119,684 | B2 | | 10/2006 | Petersen et al. | |
| 7,328,286 | B2 | * | 2/2008 | Vinnemann | 710/9 |
| 7,747,415 | B1 | * | 6/2010 | Churchill et al. | 702/187 |
| 7,860,459 | B2 | * | 12/2010 | Jeong | 455/41.2 |

(Continued)

FOREIGN PATENT DOCUMENTS

DE 10310413 A1 * 10/2003 ............. G08C 19/00
JP 4-337805 11/1992

(Continued)

OTHER PUBLICATIONS

Kirchhoff's Voltage Law 1845.*

(Continued)

*Primary Examiner* — Paul R Myers (57) ABSTRACT

A multi-drop serial bus to connect a master device to a plurality of slave devices on a data line includes a voltage divider network, comprising divider resistors in series on the data line between slave devices, and a voltage sensing device, connected to the data line, configured to detect a voltage order of signals from the slave devices, indicating a position of connection of each slave device.

23 Claims, 4 Drawing Sheets

(56) References Cited

U.S. PATENT DOCUMENTS

| | | | |
|---|---|---|---|
| 8,040,215 B2 * | 10/2011 | Zakriti | 340/4.21 |
| 2007/0091658 A1 | 4/2007 | Wiktor | |
| 2007/0156935 A1 | 7/2007 | Ellison | |

FOREIGN PATENT DOCUMENTS

| | | |
|---|---|---|
| JP | 5-289778 | 11/1993 |
| JP | 5-344124 | 12/1993 |
| JP | 2002-229693 | 8/2002 |
| JP | 2002-341981 | 11/2002 |
| JP | 2004-523045 | 7/2004 |
| JP | 2006-178931 | 7/2006 |

OTHER PUBLICATIONS

LM73 2.7V, SOT-23, 11-to-14 Bit Digital Temperature Sensor With 2-Wire Interface; Jul. 12, 2006, National Semiconductor Corp., URL: http//www.national.com/ds.cgi/LM/LM73.pdf.

ISA 220 ISR and Written Opinion.

* cited by examiner

FIG. 5

MULTI-DROP SERIAL BUS WITH LOCATION DETECTION AND METHOD

BACKGROUND

The present disclosure relates generally to systems that have modular devices interconnected to a digital device using serial bus protocols. It is often desirable to detect the physical location of devices that are attached along a serial bus. This can be desirable where it is intended for different devices to occupy a certain designated physical position along the serial bus.

Some devices that are configured to connect to a serial bus can be considered "smart" devices, and include a microcontroller and associated built-in systems to determine the location of the device on the bus. However, other devices that are configured to attach to a multi-drop serial bus are considered "dumb" devices, having no microcontroller or other system for independently determining their physical location. Nevertheless, it can be desirable to determine the physical location of these types of dumb devices on the bus. For example, in a printing system with Non Volatile Memory-enabled ink supply devices attached to a serial bus, it can be desirable to detect whether specific ink color cartridges have been misinstalled or swapped, potentially causing ink mixing. Such ink supply and other similar serial bus devices ordinarily do not include a microcontroller and the additional circuitry needed to determine their own location, and providing such would add complexity and cost to the devices.

Other approaches to detecting the physical location of dumb devices along a serial bus that have been used involve mechanical keying or additional wiring. These approaches tend to add mechanical and electrical complexity and cost to such systems.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As is well known, a serial bus is a subsystem that transfers data between a master digital device, such as a computer or microcontroller, to a group of components that are attached to the bus in series. Early computer buses were literally parallel electrical wires with multiple connections, but the term is now used for any physical arrangement that provides the same logical functionality. Modern computer buses can use both parallel and bit-serial connections, and can be wired in either a multi-drop (electrical parallel) or daisy chain topology, or connected by switched hubs, as in the case of a universal serial bus (USB). A serial bus can logically connect several peripherals over the same set of wires, and transmits data to the devices in series—that is, sending data one bit at one time, sequentially. This is in contrast to parallel communication, where all the bits of each symbol are sent together. Each serial bus defines its set of connectors to physically plug devices, cards or cables together. Serial computer buses have become more common as improved technology enables them to transfer data at higher speeds.

Figure 1:
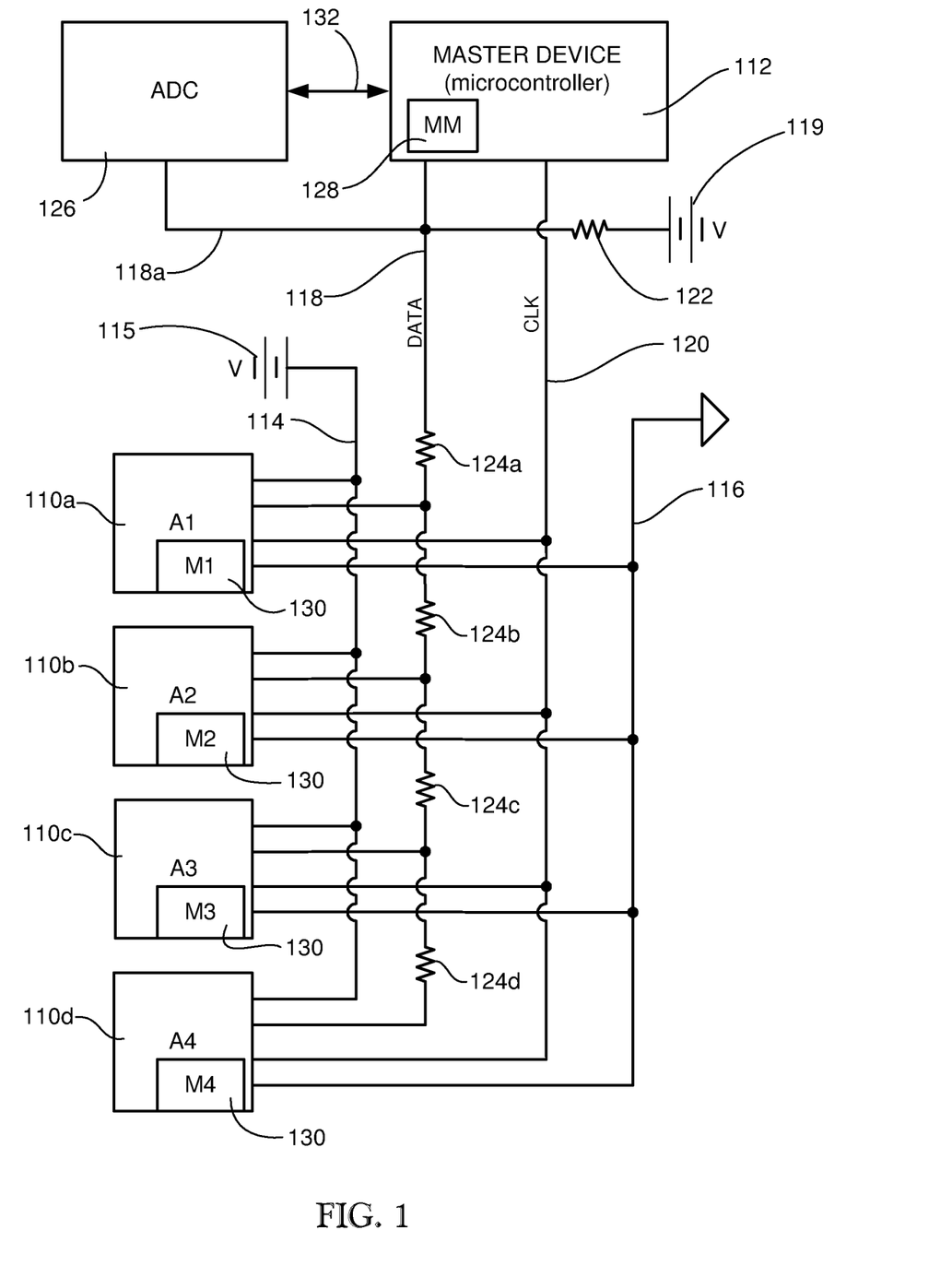
FIG. 1 is a schematic diagram of one embodiment of a serial bus system that is configured for location detection of dumb devices in accordance with the present disclosure.

As noted above, it can be desirable to detect the physical location of a device resident on a multi-drop serial bus where the device itself has no system for independently determining its location. Advantageously, a system and method have been developed for detecting the location of physical devices on a multi-drop serial bus that differentiates the devices electronically, and does not increase the number of wires in the bus. A schematic diagram of one embodiment of a serial bus is shown in FIG. 1. This bus includes multiple slave devices 110a-d (labeled A1-A4) that are connected to a master device 112 on the serial bus. The master device can be any type of microcontroller, such as a digital ASIC. Power is provided to each slave device from the power supply of the device via a voltage source 115 (e.g. at a level of 3.3 V) connected between a power line 114 and a ground line 116. Each slave device 110 includes a non-volatile memory circuit 130, which can store information such as the digital address for the slave device, an identification bit, etc.

The slave devices are all connected in series to a data line 118 and clock signal line 120 that are also interconnected to the master device 112. A data voltage V (e.g. 3.3 V) is provided on the data line 118 between a data voltage source 119 and the ground line 116. A pull-up resistor 122 is included in the data line 118 to keep the data line in a high logic state when the bus is idle.

The serial bus shown in FIG. 1 is a type of I2C serial bus. An I2C (Inter-Integrated Circuit) bus provides a communication link between integrated circuits. An I2C bus typically consists of 2 active wires and a ground connection. The active wires, called DATA and CLK (CLOCK), are initially bi-directional. Every device hooked up to the bus has its own unique address, and can be a receiver and/or transmitter, depending on the functionality of the devices. In the embodiment of FIG. 1, the slave devices are not provided with the capability of initiating data transfer.

In operation, the master device will first issue a START command, which acts as an 'attention' signal to all of the connected slave devices. The master device will then send a byte including the address of the device that the master desires to access, and a bit that provides an indication of whether the access is a read or write operation.

After receiving the address byte, all slave devices will compare it with their own address. If it doesn't match, the slave device will simply wait until the bus is released by a subsequent STOP condition that is initiated by the master device. If the address matches, however, the circuitry of the slave device will produce an acknowledge (ACK) response signal, which is returned on the DATA line.

Once the master receives the acknowledge signal, it can start transmitting or receiving DATA to or from the slave device. Those of skill in the art will be familiar with the clock synchronization and data transfer arbitration methods that govern the transfer of data on an I2C bus. When all is done, the master device will issue a STOP condition, which is a signal that the bus has been released and that the connected slave devices may expect another transmission to start any moment.

An I2C bus can allow more than one device to be active in initiating data transfers. That is the case in the embodiment of FIG. 1. In typical operation, clock signals and data signals are provided in series from the master device 112 via the clock signal line 120 and data line 118, while operational voltage for the slave devices is provided between the voltage source line 114 and ground line 116. These four lines are the common conductors in this embodiment of an I2C serial bus. However, the slave devices 110 are dumb devices, as discussed above, and do not include circuitry that allows them to determine their physical position along the bus and relay that information to the master device 112. For the master device to electronically determine the locations of the devices, additional conductors in the bus would normally be involved.

Advantageously, a resistive voltage divider network is provided in this serial bus, along with circuitry coupled to the bus that allows electronic determination of the respective physical positions of the devices 110. Specifically, this bus includes a series of divider resistors 124a-d on the data line 118, and adds a connection 118a from the data line to an analog-to-digital converter (ADC) 126. This configuration creates a ladder divider network that causes the voltage of a signal from each device 110 to vary depending upon the physical position of the device. For example, a signal from device A4 will pass through four of the divider resistors 124, while a signal from device A1 will pass through only one of the divider resistors 124. If both signals begin at the same voltage level, the signal from A4 will be at a higher voltage than that from A1 when both are sampled by the ADC. The ADC 126 includes circuitry that converts an analog voltage into a digital signal indicative of the voltage level. This digital signal is used by the master Device to electronically differentiate the physical location of the slave devices 110 on the bus based upon the voltage level of signals from the slave devices.

The ADC 126 can be a dumb device, like the slave devices 110, and receives control signals from and provides data to the master device 112 via a communication link 132 (which can be another communication bus). While the ADC is shown as a device separate from the master device, the ADC can be part of the master device physically, or it can be in a separate location. The ADC and the ladder divider network are designed to operate outside the data transfer voltage range of the master device 112, so as not to interfere with normal data transfer, yet to allow differentiating location by detecting the voltage order of the devices on the bus when communicating digitally with them. For example, the master device 112 can be configured to operate with a lower threshold data transfer voltage of 1 V, so that any signals at levels below 1 V are ignored. However, the master device 112, using the converted voltage from the ADC 126, can be configured to distinguish between specific signals that are below 1 V and some amount above zero (e.g. 100 mv) to allow positional identification.

Each divider resistor 124 has a resistance sufficient so that the voltage created between the sum of the divider resistors 124 and the pull-up resistor 122 is a voltage below the low voltage threshold. However, the resistance of the divider resistors is small enough so that data signals from the master device during normal operation are not compromised. In one embodiment, the divider resistors each have a resistance of about 51 ohm, though this is only one of many resistance levels that can be used. Moreover, the divider resistors in a given group can have different resistance levels, as discussed below.

As noted above, each slave device 110 has a unique digital address. This digital address can be stored in the memory circuit 130 of the respective slave device. The master device also includes a memory location 128 (labeled MM) in which the digital addresses of the slave devices are stored. A flowchart outlining the logical steps in one embodiment of a method for detecting the location of devices on a serial bus like that shown in FIG. 1 is provided in FIG. 2. In general, the master device 112 is programmed to write a data byte to each slave device, then query each slave device in sequence, using each device's unique digital address, to return the data byte. The data byte is specifically selected to include at least one zero bit. This zero bit provides a low voltage signal that the ADC can convert to a digital value for use by the master device. The master device reads this digital value, which is correlated with the slave device address, and can then determine whether the slave devices are positioned in the correct order.

Figure 2:
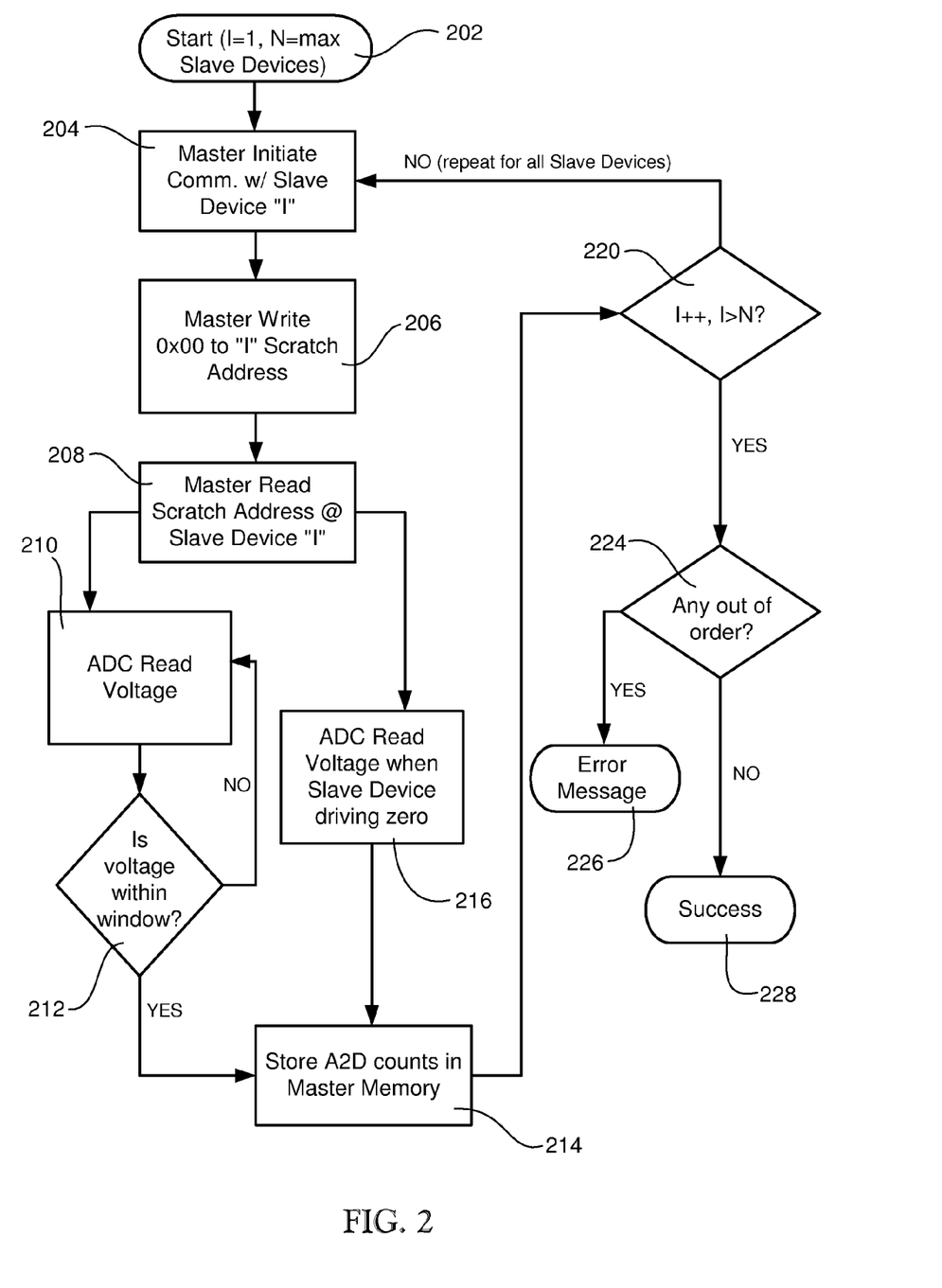
FIG. 2 is a flowchart showing the logical steps in one embodiment of a method for detecting the location of devices on a serial bus in accordance with the present disclosure.

The steps in one embodiment of this process are outlined in more detail in the flowchart of FIG. 2. The programming of the master device 112 first sets a variable "I" equal to 1, and a variable "N" equal to the maximum number of slave devices that can be attached to the bus. (step 202) Next, the master device initiates communications with slave device "I", which initially will be the first slave device. (step 204) The communications initiation process can follow a standard I2C protocol, which involves first sending a START pulse, as discussed above. Following the bus data transfer protocol, the master device then writes a data byte to a specified memory location (130 in FIG. 1) of the particular slave device. (step 206) This memory location is referred to as the "Scratch Address". This data byte can comprise, for example, the digital sequence 00000000 (represented by the hexadecimal "0x00" in step 206). This sequence is useful because 0 digits are represented by low voltage pulses, but will not have a true 0 value when the slave device drives the bus. The data byte can have a different sequence, so long as it includes at least one data zero. Upon receiving and storing this data byte at the Scratch Address in its memory, the slave device will send an acknowledge pulse, which the master device receives by reading the data node voltage. (still step 206).

Figure 3:
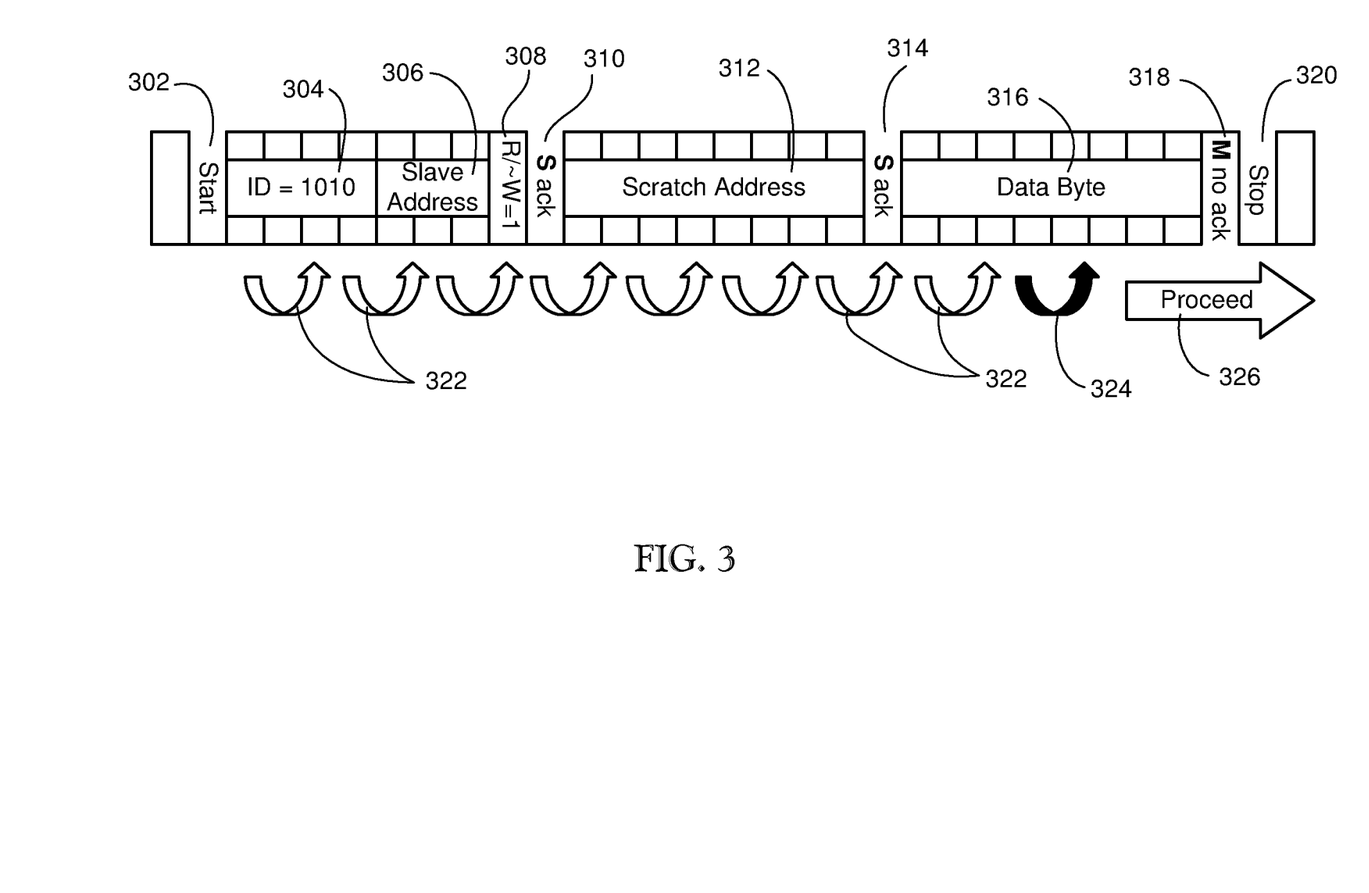
FIG. 3 is a diagram of two alternative data read sequences that can be used in accordance with an embodiment of a method for detecting the location of devices on a serial bus in accordance with the present disclosure.

Once the data byte has been written to the Scratch Address, the master device 112 then initiates a read sequence to read the data byte from the Scratch Address. (step 208) This read process includes several substeps, illustrated in FIG. 3, which provides an example of a bit sequence that can be transmitted during this process. Viewing FIG. 3, the START signal 302 is a two pulse sequence that alerts all slave devices to prepare to receive a signal. Following the START signal, the master device will then transmit a byte that includes the address of the slave device to be accessed. As shown in FIG. 3, this byte can include multiple parts. The first four digits 304 of the address byte can be a device type identifier. In the embodiment shown in FIG. 3, these digits are 1010, which identifies the device as a non-volatile memory device. Those of skill in the art will recognize that other device type identifiers can be used for different types of devices that can be connected to a data bus. The next three digits 306 can represent the specific address of the slave device to be accessed. Those of skill in the art will recognize that a three digit address group will allow up to eight different digital addresses, which can be sufficient for many devices. If more slave devices are to be used, a longer address sequence can be used and provided in this first byte. The last bit 308 of this byte is a Read/Write bit, which in this case is set to 1 to indicate that the master device intends to read data from the slave device.

Upon receiving this first byte that is transmitted from the master device, the slave device that recognizes the address sequence 306 will send an acknowledge pulse 310 on the DATA line. As noted above, under the standard I2C protocol, slave devices that do not recognize the address sequence do not respond, and will ignore all subsequent transmissions until after the next STOP signal is sent.

Upon receiving the acknowledge pulse 310, the master device will then transmit an address byte 312. This address byte includes the Scratch Address, and indicates that the master device wants to read the data that is stored at the Scratch Address. As noted above, the data stored at the Scratch Address is the data byte that includes at least one data zero, which the master device previously wrote to the Scratch Address memory location in step 206. Upon receiving the address byte, the slave device will send another acknowledge pulse 314.

At this point two things happen. First, the slave device will begin to drive the DATA line 118, and will transmit the data byte sequence 316 that is stored at the Scratch Address. At the same time, the master device will prompt the ADC 126 to read the voltage on data line 118a. This reading step can happen in at least two different ways, as indicated by the branch at this point in the flow chart of FIG. 2. The first approach to the reading step involves a continuous read. In this approach, the ADC reads the data node voltage repeatedly (step 210) until it receives a voltage signal that is within a specified voltage window (step 212).

As noted above, the specified voltage window for slave device location detection is a voltage range outside the data transfer voltage range, such as below a lower threshold voltage of 1 v, for example, and above zero by some amount, such as 100 mv. During normal data transfer, the data line is pulled to 0 v for a data zero, and some value above the threshold voltage for a data 1. Consequently, any pulses that have a voltage that falls between these values are recognized as data zeros by the master device. However, the ADC can be configured to convert analog voltage pulses on the data line 118a that are below the data threshold and above zero by some amount into digital signals indicating the specific analog voltage level. Advantageously, while a data zero that is recognized by the master device will have a voltage that is zero, when the data line is driven by a slave device and the slave device transmits a data zero, the voltage will be below the threshold but above true zero, which is within the desired voltage window or range for location detection. Moreover, by virtue of the resistor divider network, these voltages will vary depending upon the device location from which they are transmitted.

In the continuous read approach, the ADC 126 will sample voltage pulses on the data line 118a at some sampling rate that is higher (usually at least 2 times higher) than the bit rate on the data line. This higher sampling rate ensures that each bit pulse will be sampled. If a voltage pulse is not within the voltage window discussed above (as determined at step 212), the read process (step 210) will repeat. This will continue until the ADC detects a voltage pulse that is within the voltage window for location detection.

This continuous read approach is illustrated in FIG. 3, wherein a series of hollow arrows 322 indicate repeated reading of the voltage on the data node by the ADC. This reading step will continue until the desired low voltage signal is received. So long as the data byte 316 that is driven by the slave device includes at least one data zero, this will provide at least one low voltage signal, within the voltage window, as determined at step 212. The master device can be programmed not to expect a valid return signal on the data line during the location detection routine—i.e., to ignore the data byte. Alternatively, the master device can be programmed to compare the data byte with the byte that was originally written by the master device to the scratch address, to verify that there has not been an error. In accordance with the standard I2C protocol, at this point in the process no acknowledge pulse is generated, as indicated at 318 in FIG. 3. The master device can then provide a STOP signal pulse 320, returning the bus to an idle condition, ready to proceed with subsequent data exchange, as indicated at 326.

As an alternative to the continuous read approach, the reading step can be timed to only read the return signal voltage when the slave device is driving data zeros. (step 216) This approach is also illustrated in FIG. 3. In this alternative, the system is programmed so that ADC will read the data node only when the slave device is driving a zero (representing the data byte). Because the sampling rate is faster than the bit rate on the bus, the timing of voltage sampling can be very accurately selected. Also, because the bit sequence of the data byte 316 is known, the moment of voltage sampling can be accurately timed to coincide with a point at which a data zero of the data byte is being transmitted by the slave device. In one embodiment, the ADC read has been successfully timed to coincide with transmission of the fourth bit of the data byte. Thus, so long as the fourth bit is a data zero, the timed read will be successful for location detection. Where, as here, the data byte represents all zeros, the timed approach is even more simplified.

The timed data read approach is represented by the solid read arrow at 324 in FIG. 3. This arrow represents that the ADC read step is performed only once in the timed approach, rather than repeatedly in the continuous read approach (represented by arrows 322). Because the ADC read is timed to coincide with a data zero driven by the slave device, the voltage of the returned signal will fall within the specified voltage window and no additional step is needed to verify this.

Whether the continuous or timed method is used, once the ADC 126 has read the voltage of the data line 118a when the slave device was driving a data zero, the analog voltage value that the ADC detected will be converted to a corresponding digital value. The master device 112 can then read this digital value (via the communication link 132) and store it in memory 128 in a location corresponding to the device address, which can be represented in this case by the "I" value. (step 214) Stated differently, the master device writes a predetermined data byte to a slave device with a particular address, then prompts the slave device to transmit the data byte, and reads a digital signal from the ADC that represents the voltage of a data zero of the data byte, and stores that value in memory associated with the slave address.

Returning to FIG. 2, following reading of the data byte (316 in FIG. 3) from the slave device, the system will then increment the "I" value and repeat the process for each slave device, that is, until I=N. (Step 220). Because of the resistor divider network, the exact voltage level of the zero bit of the data byte that is returned will depend upon the physical location of the slave device along the bus. Once an ADC voltage read of the data byte from each slave device has been completed, a complete array of the voltage values and corresponding "I" values or addresses of the slave devices will be contained in memory in the master device. The master device can then analyze the voltage values with respect to their addresses to determine whether the slave devices are in order. (step 224) This involves unshuffling or arranging the voltage values in order of the identity of the slave device (the value of "I" being a surrogate for the device identity or address) and then viewing the particular voltage value that was returned in the above steps.

Figure 4:
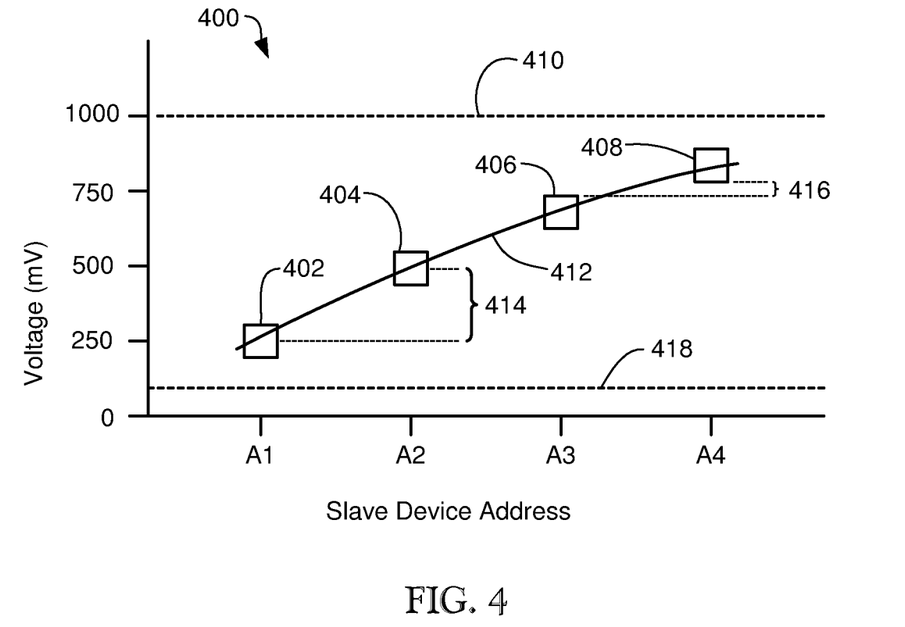
FIG. 4 is a graph of voltage versus slave device address showing a monotonic response curve indicating correct positioning of devices along an embodiment of a serial bus having a location detection system in accordance with the present disclosure.
Figure 5:
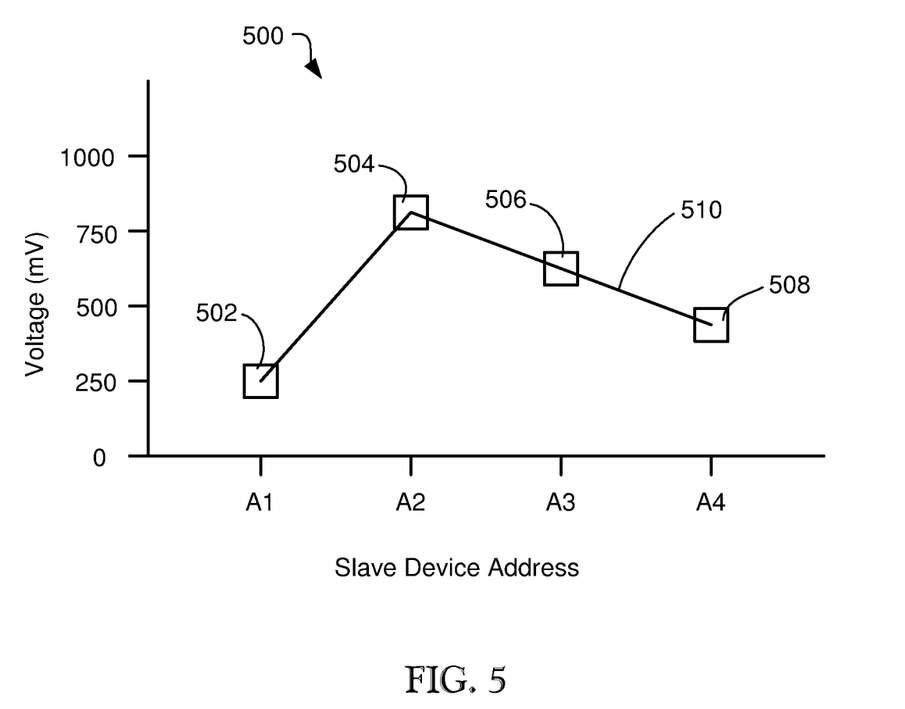
FIG. 5 is a graph of voltage versus slave device address showing an irregular response curve indicating incorrect positioning of devices along an embodiment of a serial bus having a location detection system in accordance with the present disclosure.

Two graphs representing the results of this unshuffling process are provided in FIGS. 4 and 5. The graph 400 of FIG. 4 represents the type of results that are expected when the slaves devices are in the proper locations, and the graph 500 of FIG. 5 represents an out of order condition. Each of the data point boxes 402-408 represent voltage values that correspond to specific slave device identities or addresses A1-A4. In this analysis, the order of the addresses A1-A4 corresponds to the desired order of location of the slave devices along the bus. These voltage values are all below the data transfer threshold voltage 410, and above some minimum voltage threshold 418, such as 100 mv.

When the slave devices are all in the proper physical location along the bus, the data points of this graph will substantially line up to produce a monotonic function, represented by the curve line 412. Where the divider resistors (124 in FIG. 1) all have the same resistance value, this curve will tend to be logarithmic in shape. Those of skill in the art will recognize that resistance values can be selected to cause this curve to be substantially linear. In any event, where the slave devices are in the proper order, the curve will be monotonic, with the voltage values ascending or descending with the slave devices in order, depending upon the order of sampling. This monotonic function is created because the resistor divider network produces an incremental change in voltage depending upon the location on the bus of the respective slave device. While the curve 412 shown in FIG. 4 is a rising curve, it could also be a falling curve if the query order of the slave devices is reversed.

The spacing 414 of the nominal voltages (i.e. the voltage level or range that is to be provided by each device) is arbitrary, and can be selected to prevent noise from indicating a false order. For example, if the circuit can produce noise that could shift the voltage results by 100 mv, the spacing 414 of the nominal voltages can be selected to be 200 mv, so that signal noise will not provide a false order. The spacing of the nominal voltages depends in part upon the resistance of each of the divider resistors (124 in FIG. 1). Resistors with a resistance of 51 ohm have been used in a system having four slave device positions on a serial bus with an operating voltage of 3.3 V. This configuration provides nominal voltage spacing of about 200 mv between the slave device signals. The range of variability of the value of each data point is represented by the vertical dimension of the square data point boxes 402-408. This nominal spacing 414 of the data values helps keep the data point spacing 416 greater than zero, to ensure that the actual order will be represented.

Returning to FIG. 2, the monotonic curve 412 shown in FIG. 4 indicates that the slave devices are in order. Consequently, the query at step 224, whether any devices are out of order, will produce a negative answer, and the system will return a positive indication of slave device order. (step 228) However, if the slave devices are out of order, a graph like the graph 500 of FIG. 5 can be created. In this graph, the curve 510 that is produced by the data points 502-508 is not a monotonic function. Based upon this curve, either device A2 and A4 are out of order, or all devices are out of order because the voltage values are not consistently rising or falling. When such a situation occurs, the query at step 224 of FIG. 2 will indicate that at least one device is out of order. In this condition, the system can be programmed to produce an error message to the user (step 226), allowing remedial action to be taken. The system could also be programmed to provide a more detailed error message that indicates the apparent nature of the error—e.g., which devices appear to be out of order, etc.

The location detection sequence outlined in FIG. 2 can be performed repeatedly at timed intervals, or based upon triggering events. Naturally, where the sequence is performed and an out of order signal is returned, the system can be programmed to repeat the process until a success signal is received.

The system and method disclosed herein thus allows detection of the location of dumb slave devices along a serial bus without the addition of more conductors in the bus, or additional location detection circuitry in the slave devices. Location detection occurs when the slave device is driving the data line with a data string including at least one data zero. By virtue of the divider resistor network, the voltage of the data zero portion of the signal received from each slave device will vary depending upon the physical location of the device. This allows a specialized circuit in communication with the data line and an analog-to-digital converter to differentiate the location of each device.

While a low voltage example has been given, it should be recognized that a similar process can be followed using signals that are above a high voltage threshold of the master device. For example, the master device can have an upper voltage threshold of 5 volts for data transfer, and can be configured to ignore signals above that voltage. Accordingly, the process described above can be configured to operate within a voltage range that is above 5 V (e.g. from 6-8 V), the resistor divider network comprising resistors having resistance values that will provide the desired positional voltage stepping function within this higher voltage range. This system and method thus provides a serial data bus divider network that enables the electrical detection of the physical location of devices along a multi-drop serial bus by differentiating low (or high) voltage signals that are outside the voltage range of data transfer.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A multi-drop serial bus to connect a master device to a plurality of slave devices on a data line, comprising:
   a voltage divider network, comprising divider resistors in series on the data line between slave devices; and
   a voltage sensing device, connected to the data line, configured to detect a voltage order of signals from the slave devices, indicating a position of connection of each slave device.

2. A multi-drop serial bus in accordance with claim 1, wherein the voltage sensing device comprises an analog-to-digital converter, coupled to the master device, configured to convert an analog voltage on the data line to a digital value representative of the analog voltage level.

3. A multi-drop serial bus in accordance with claim 2, wherein the analog-to-digital converter is configured to convert analog voltages that are within a voltage range that is below a data exchange voltage threshold of the master device, and above zero volts.

4. A multi-drop serial bus in accordance with claim 2, wherein the master device includes a memory location, containing the digital value, read from the analog-to-digital converter, correlated with a unique slave device identity, the digital value representing the position of connection of the unique slave device.

5. A multi-drop serial bus in accordance with claim 1, wherein each slave device includes a memory location containing a data byte including at least one zero bit.

6. A multi-drop serial bus in accordance with claim 1, wherein the slave devices comprise non-volatile memory enabled ink supply devices associated with a printing system.

7. A multi-drop serial bus in accordance with claim 1, wherein the plurality of slave devices comprise four slave devices.

8. A multi-drop serial bus in accordance with claim 1, wherein the divider resistors all have a common resistance value.

9. A multi-drop serial bus in accordance with claim 8, wherein the divider resistors all have a resistance of 51 ohm.

10. A multi-drop serial bus in accordance with claim 1, wherein the divider resistors have different resistance values.

11. The multi-drop serial bus in accordance with claim 1 further comprising the master device, wherein the master device is configured to electronically differentiate a physical location of the slave devices on the bus based upon the voltage order of the signals from the slave devices.

12. A multi-drop serial bus to connect a master device to a plurality of slave devices at multiple physical positions on a data line, comprising:
    means for providing a unique signal on the data line from one of the slave devices depending upon a position of the slave device; and
    means, connected to the data line, for detecting an order of signals from the slave devices, indicating the position of the one of the slave devices.

13. A multi-drop serial bus in accordance with claim 12, wherein the means for providing a unique signal on the data line comprises a voltage divider network, including divider resistors in series on the data line between slave devices.

14. A multi-drop serial bus in accordance with claim 12, wherein the means, connected to the data line, for detecting an order of signals from the slave devices, indicating the position of the slave device, comprises an analog-to-digital converter, coupled to the master device, configured to convert an analog voltage on the data line to a digital value representative of the analog voltage level.

15. A method for detecting a physical location of a slave device on a multi-drop serial bus having a data line, comprising the steps of:
    a) providing a unique signal from the slave device on the data line, the data line having divider resistors in series between a plurality of slave device connection locations; and
    b) detecting a voltage of the unique signal, indicating the connection location of the slave device on the data line.

16. A method in accordance with claim 15, wherein the step of providing a unique signal from the slave device on the data line comprises the steps of:
    c) writing a unique data byte to a memory location of the slave device; and
    d) the slave device transmitting the unique data byte on the data line.

17. A method in accordance with claim 15, wherein the step of detecting a voltage of the unique signal comprises detecting the voltage on the data line with an analog-to-digital converter configured to convert an analog voltage on the data line to a digital value representative of the analog voltage level.

18. A method in accordance with claim 17, further comprising the step of:
    c) reading the digital value and comparing the digital value with a stored identity indicator of the slave device, via a master device, coupled to the data line and to the analog-to-digital converter.

19. A method in accordance with claim 18, further comprising the steps of:
    d) repeating steps (a) through (c) for a plurality of slave devices, each slave device having a unique address, the unique addresses having a linear order; and
    e) determining whether the digital values, when arranged in the linear order, produce a monotonic function.

20. A method in accordance with claim 15, wherein the step of providing a unique signal comprises the slave device driving a data byte containing at least one zero bit, the voltage on the data line produced by the zero bit falling within a voltage range that is below a data exchange voltage threshold of a master device coupled to the data line, and above zero volts.

21. A method in accordance with claim 15, wherein the step of detecting a voltage of the unique signal is selected from the group consisting of (a) repeatedly sampling a voltage on the data line until the unique signal is received, and (b) sampling a voltage on the data line at a time when the unique signal is anticipated to be received.

22. The method in accordance with claim 15 further comprising determining a physical location of the slave device on the multi-drop serial bus based upon the detected voltage of the unique signal.

23. The method in accordance with claim 15, wherein the unique signal from the slave device has a different voltage based upon a physical location of the slave device on the data line and wherein the method further comprises determining the physical location of the slave device based upon the detected voltage from the slave device.

* * * * *